T. E. KENDALL & F. E. WARREN.
HORSE RELEASER.
APPLICATION FILED MAY 31, 1912.
1,053,611.
Patented Feb. 18, 1913.
2 SHEETS—SHEET 1.
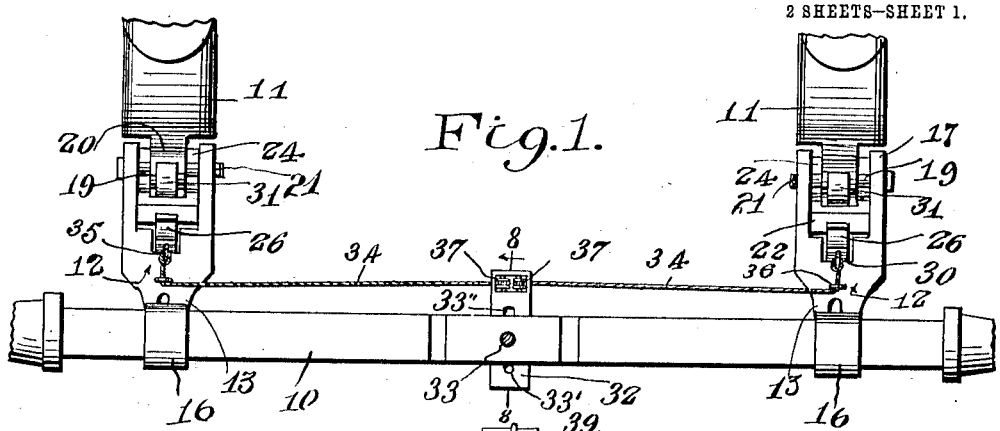
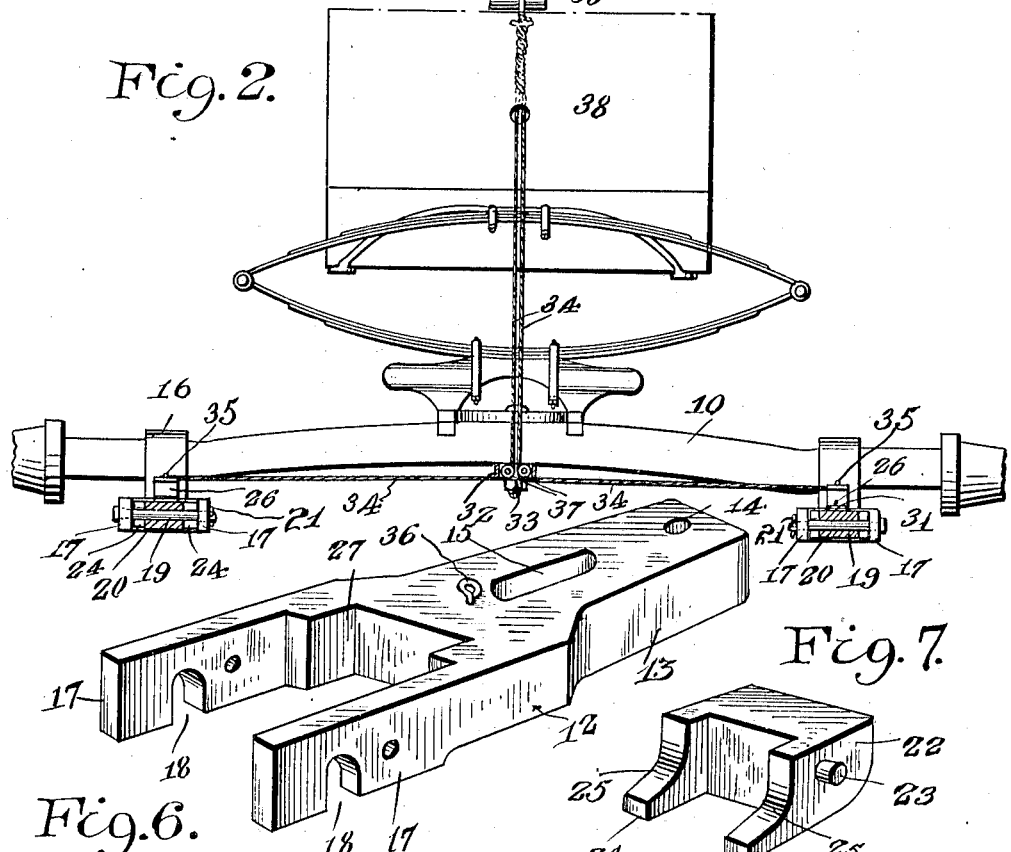
Inventors,
T. E. Kendall
F. E. Warren

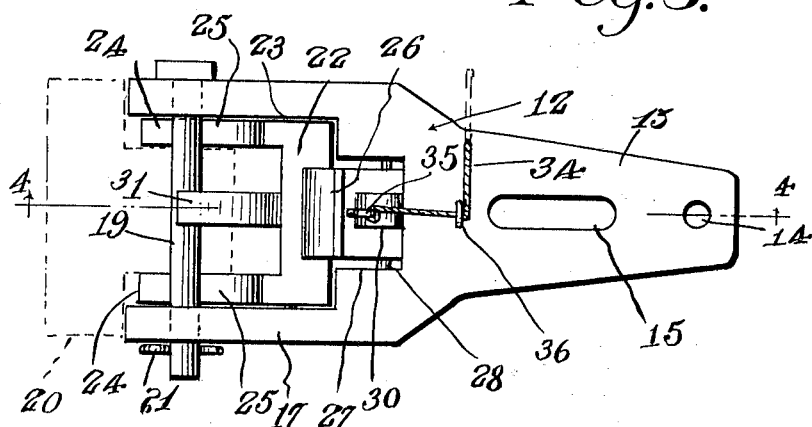
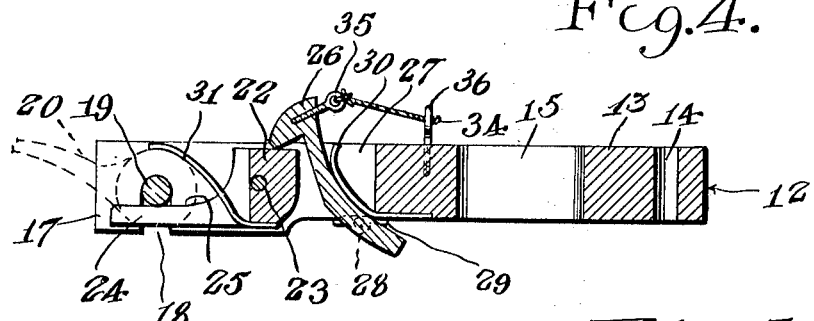
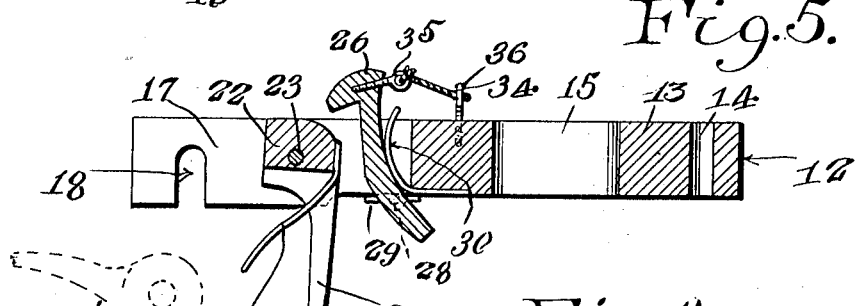
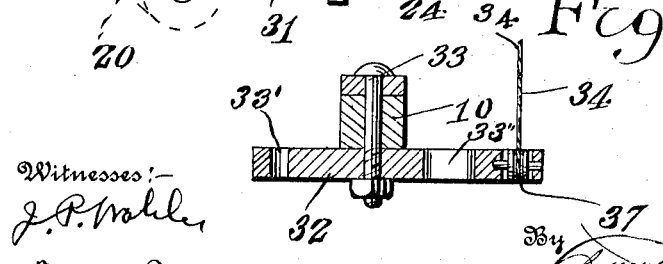

UNITED STATES PATENT OFFICE.

THERON E. KENDALL AND FLOYD E. WARREN, OF GILMORE CITY, IOWA.

HORSE-RELEASER.

1,053,611. Specification of Letters Patent. Patented Feb. 18, 1913.

Application filed May 31, 1912. Serial No. 700,823.

*To all whom it may concern:*

Be it known that we, THERON E. KENDALL and FLOYD E. WARREN, citizens of the United States, residing at Gilmore City, in the county of Pocahontas, State of Iowa, have invented certain new and useful Improvements in Horse-Releasers; and we do hereby declare the following to be a full, clear, and exact description of the invention, such as will enable others skilled in the art to which it appertains to make and use the same.

This invention relates to horse releasers and has for an object to provide a horse releaser that will be composed of but three main parts which will be strong and durable and will not easily get out of order.

With the above object in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a plan view of the device applied to a pair of shafts. Fig. 2 is a front elevation of the device with the shafts shown in cross section. Fig. 3 is an enlarged plan view of the device. Fig. 4 is a longitudinal sectional view taken on the line 4—4 Fig. 3. Fig. 5 is a similar view to Fig. 4 but showing the parts in released position. Fig. 6 is a detail perspective view of the securing member. Fig. 7 is a detail perspective view of the pivotal holding member. Fig. 8 is a cross sectional view taken on the line 8—8 Fig. 1.

Referring now to the drawings in which like characters of reference designate similar parts, 10 designates an axle and 11 a pair of shafts, the latter being detachably connected to the axle by the coupling members comprising the subject-matter of this invention. Each coupling member consists of a forked securing member 12, the shank 13 of which is provided with an opening 14 and a slot 15 to receive the legs of the axle clip 16, the slot permitting of the securing member being applied to axles of various widths.

The branches 17 of the securing member are equipped in the underneath faces with alined slots 18 which receive the bolt 19 of the shaft iron 20, a cotter pin 21 being passed through the end of the bolt in lieu of the usual nut so that the bolt will loosely fit in the slots.

For detachably securing the bolt in the slot a holding member in the nature of a block 22 is pivotally mounted between the branches 17 of the securing member, a pivot pin 23 being passed transversely through the block and through the branches to attain this end. The block is provided with parallel forwardly extending arms 24 which underlie the bolt 19 and are cut away on their upper edges as shown at 25 to receive the bolt.

For normally holding the holding member in operative position a catch 26 in the nature of a hook is pivotally mounted in a slot 27 formed in the securing member between the branches thereof, the shank of the catch projecting below the bottom face of the securing member and being loosely mounted on a pivot pin 28 the ends of which are fixed in bearings 29 formed in the branches of the securing member. A leaf spring 30 is fixed to the bottom face of the securing member and projects up through the slot 27, this spring bearing against the catch and holding the same hooked over the top face of the holding member.

The spring 30 yields rearwardly into the slot 27 upon the hooked end of the catch being pulled rearwardly as will be presently described, whereupon the holding member is free to tilt downwardly at the forward end and release the bolt 19, this tilting movement of the holding member being assisted by a leaf spring 31 which is secured to the bottom face of the holding member and curves upwardly between the arms thereof thence extends forwardly over the top face of the bolt, and in addition to tilting the holding member serves as an antirattler to prevent rattling of the bolt.

For attaching the catch tripping cables hereinafter described to the vehicle, a strap or bar 32 is arranged on the under side of the axle and is equipped with an opening to receive the king bolt 33, and is further equipped with an opening 33' and a slot 33" to receive the central clip of the axle when the latter is used to secure the member.

For simultaneously releasing both shaft iron bolts a cord or the like 34 is secured in an eye 35 carried on the top of the hooked end of the catch 26, the cord being trained through an eye 36 carried on the top face of the securing member, thence carried up to and trained through a pulley 37 carried upon the member 32. The cords from both catches being thence trained upwardly on the dash side by side through an eye 38 disposed on the dash and terminally connected by a handle 39 by means of which both cords may be simultaneously pulled to release the catches and simultaneously release both shaft iron bolts 19 as above described.

What is claimed, is:—

A horse releaser including a coupling comprising a forked attaching member adapted to be secured to a vehicle, the branches of said member being formed on the underneath faces with alined slots to receive the draft iron attaching pin, a holding member comprising a block pivotally mounted between said branches and having forwardly extending arms adapted to underlie and engage said pin, a leaf spring carried by said block and projecting upwardly between said arms and thence forwardly over and adapted to bear down upon said pin, a catch pivotally mounted between said branches having a hooked extremity engaging the top face of said holding member in rear of the pivot thereof, and normally maintaining the holding member in operative position, and means for releasing said catch.

In testimony whereof, we affix our signatures in presence of two witnesses.

THERON E. KENDALL.
FLOYD E. WARREN.

Witnesses:
 A. C. WARNER,
 C. B. FITCH.

---

Copies of this patent may be obtained for five cents each, by addressing the "Commissioner of Patents, Washington, D. C."